United States Patent [19]

Nakamura et al.

[11] Patent Number: 4,959,570
[45] Date of Patent: Sep. 25, 1990

[54] MOTOR COOLING SYSTEM

[75] Inventors: Kosei Nakamura, Hino; Yoshiyuki Hayashi, Yamanashi, both of Japan

[73] Assignee: Fanuc Ltd., Yamanashi, Japan

[21] Appl. No.: 353,621

[22] PCT Filed: Jul. 9, 1988

[86] PCT No.: PCT/JP88/00690

§ 371 Date: Mar. 7, 1989

§ 102(e) Date: Mar. 7, 1989

[87] PCT Pub. No.: WO89/00784

PCT Pub. Date: Jan. 26, 1989

[30] Foreign Application Priority Data

Jul. 9, 1987 [JP] Japan ............................ 62-169680

[51] Int. Cl.$^5$ ............................................. H02K 9/00
[52] U.S. Cl. ........................................ 310/54; 310/45; 310/59
[58] Field of Search ................. 310/54, 43, 57, 58, 310/59, 64, 60 R, 45, 260, 261, 258, 254, 270

[56] References Cited

U.S. PATENT DOCUMENTS

| | | | |
|---|---|---|---|
| 2,188,398 | 1/1940 | Bernard | 310/54 |
| 3,158,009 | 11/1964 | Rayner | 310/54 |
| 3,217,193 | 11/1965 | Rayner | 310/54 |
| 3,241,331 | 3/1966 | Endress | 310/54 |
| 3,479,541 | 11/1969 | Robinson | 310/54 |
| 3,648,085 | 3/1972 | Fujii | 310/54 |

FOREIGN PATENT DOCUMENTS

| | | | |
|---|---|---|---|
| 1029919 | 5/1958 | Fed. Rep. of Germany | 310/54 |
| 2145126 | 3/1973 | Fed. Rep. of Germany | 310/54 UX |
| 48-77303 | 4/1973 | Japan . | |
| 48-36606 | 7/1973 | Japan . | |
| 51-25705 | 6/1976 | Japan . | |
| 60-162954 | 3/1985 | Japan . | |
| 1354247 | 5/1974 | United Kingdom | 310/54 |

*Primary Examiner*—R. Skudy
*Attorney, Agent, or Firm*—Armstrong, Nikaido, Marmelstein, Kubovcik & Murray

[57] ABSTRACT

A motor cooling system in which the stator (1) of a motor is coated with a coating layer (11), and a cooling liquid is applied to the projecting portions (10) of stator coils and to the side portions of the rotor (2) to cool the motor. The motor cooling system is advantageously applicable to a spindle motor for a machine tool.

4 Claims, 3 Drawing Sheets

MOTOR COOLING SYSTEM

TECHNICAL FIELD

The present invention relates to a motor cooling system, and, more particularly, to a motor cooling system advantageously applicable to cooling a spindle motor for a machine tool.

BACKGROUND ART

Self-cooling type motors are usually equipped with an individual fan motor at the rear end thereof, but a spindle motor for rotatively driving the spindle (tool spindle) of a machine tool cannot be satisfactorily cooled by a self-cooling fan, because the spindle motor operates over a wide speed range of from a low speed to a high speed.

Accordingly, as shown in FIG. 3, the conventional spindle motor is provided, on the outer circumference of a stator 1, with an oil jacket 3 having helical groove 31 formed in the outer circumference thereof and covered with an outer sleeve 4, to form a path extending from an inlet opening 30 formed on the outer sleeve 4 to an outlet opening 32 formed on the outer sleeve 4, and a cooling liquid is passed through the path as indicated by arrows $F_1$ and $F_2$ to cool the oil jacket 3.

The conventional oil jacket cooling system cannot efficiently cool the stator, because this is an indirect cooling system which removes heat transferred, from the stator heated by the heat generated by the projecting portions 10 of the coils, to the oil jacket.

Furthermore, the conventional cooling system cannot remove heat generated in the rotor 2 and in end rings 20 attached respectively to opposite ends of the rotor 2 on the drive shaft 5.

The present invention provides a means which eliminates the disadvantages of the conventional motor cooling system, and is capable of removing heat generated in the rotor and the stator coils.

DISCLOSURE OF THE INVENTION

As exemplified in FIG. 2, a stator 1 is processed by molding to apply a coating layer 11 of a synthetic resin over projecting portions 10 of stator coils projecting from the opposite ends of a stator core and the resin coats a core of the stator, nozzles 9 are inserted through a housing H in the interior of the spindle motor driven by drive shaft 5, a cooling liquid (or oil) L is sprayed by the nozzles 9 over the stator coils and the end rings 20 of the rotor 2, and the cooling liquid L is drained through outlet openings 92.

Thus, both the rotor and the stator coils coated with the synthetic resin can be directly cooled to increase the coefficient of heat convection and the coefficient of cooling, whereby the motor can be efficiently cooled.

Since the cooling liquid can be applied directly to the heat generating members, namely, the stator coils, the rotor and the end rings, the heating of the motor can be remarkably reduced compared with the heating of the conventional motor, and the motor can be made more compact.

Efficient cooling makes it possible to reduce the size of the spindle motor, and increase the output capacity by increasing the current supply, to thereby widen the output range of the spindle motor.

BEST MODE OF CARRYING OUT THE INVENTION

EXAMPLE 1

Figure 1:
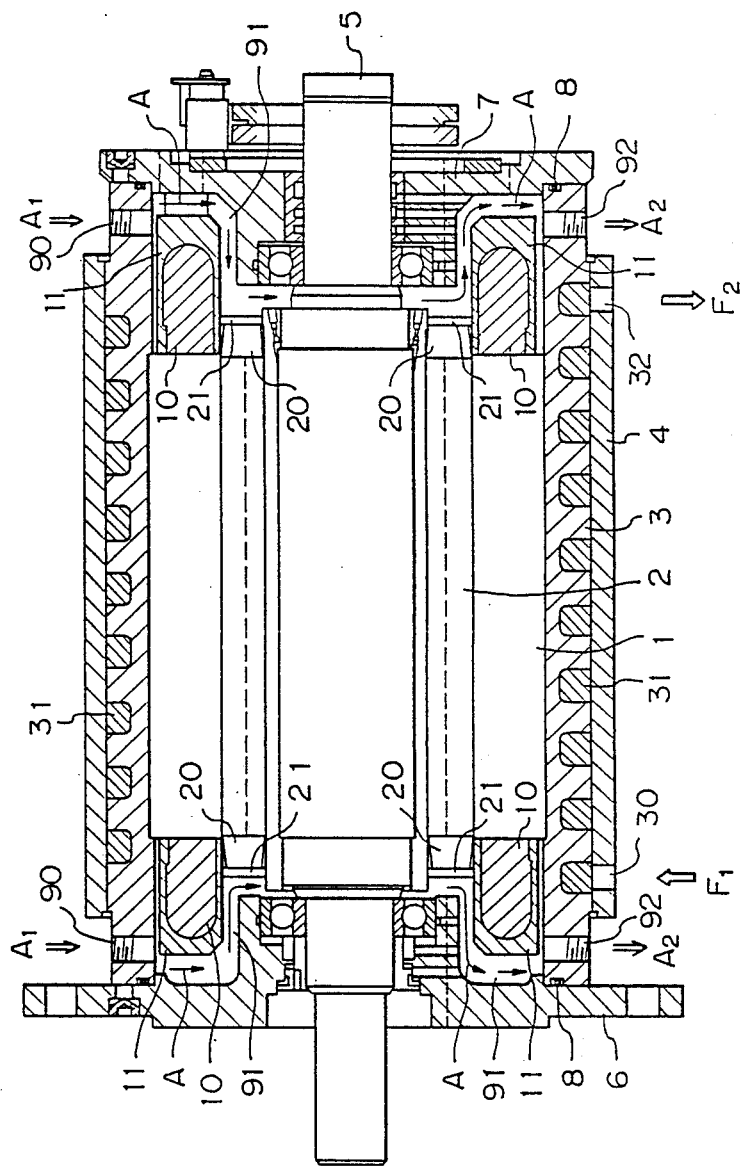
FIG. 1 is a sectional view of a motor employing a motor cooling system in a first embodiment according to the present invention.

FIG. 1 shows a spindle motor having a stator length of 346 mm and a stator outside diameter of 180 mm, to which the present invention is applied. A stator 1 having stator coils with partly projecting portions 10 which project from the opposite ends of a stator core and is coated with a layer of a synthetic resin 11 by molding and is finished by machining the layer of the synthetic resin. A rotor 2 fixedly provided at opposite ends thereof with end rings 20 each coated with a synthetic resin coating 21 is combined with the stator 1 to construct a motor having a drive shaft 5. The motor is sealed in a watertight fashion by fitting an oil jacket 3 on the outer circumference of the stator, and fixedly attaching a front flange 6 and a rear housing 7 respectively to opposite ends of the oil jacket which is sealed with a sealing ring 8.

The oil jacket 3 is provided in the outer circumference thereof with a helical groove 31, and an outer sleeve 4 is fitted on the outer circumference of the oil jacket 3 to define a path for a cooling liquid between the helical groove 31 and the inner circumference of the outer sleeve 4. The opposite ends of the helical groove 31 are connected respectively to an inlet opening 30 and an outlet opening 32 formed in the outer sleeve 4. Inlet openings 90 and outlet openings 92 are formed respectively at opposite ends of the oil jacket 3 to form flow passages 91 each extending from the inlet opening 90 through outer ends of the stator coils and the outer surface of the end ring 20 to the outlet opening 92.

In operation, an oil (High-pressure Insulating Oil A, Nisseki K.K.) having a specific weight of 0.881, a viscosity of 7 cst and an ignition point of 135° C. was injected into the interior of the motor at a pressure of 0.7 kg/cm$^2$ through the inlet openings 30 and 90 of the oil jacket 3 to make the oil flow through a path $F_1$, $F_2$ extending from the inlet opening 30 via the helical groove 31 to the outlet opening 32, and through paths $A_1$, $A_2$ extending from the inlet opening 90 via the flow passage 91 to the outlet opening 92.

Heat generated by the stator coils and transferred to the stator core was conducted through the oil jacket to the oil flowing through the helical groove 31, which carried away the heat. Heat generated by projecting portions 10 of the stator coils projecting from the stator and heating the end rings 20 was absorbed and carried away by the oil flowing through the flow passages 91.

Since the projection portions 10 of the stator coils of the stator 1 are coated with a synthetic resin coating layer 11, and the rotor 2 is coated with a synthetic resin coating layer 21, the direct cooling of the motor by the oil did not cause any problem in the function of the motor.

EXAMPLE 2

Figure 2:
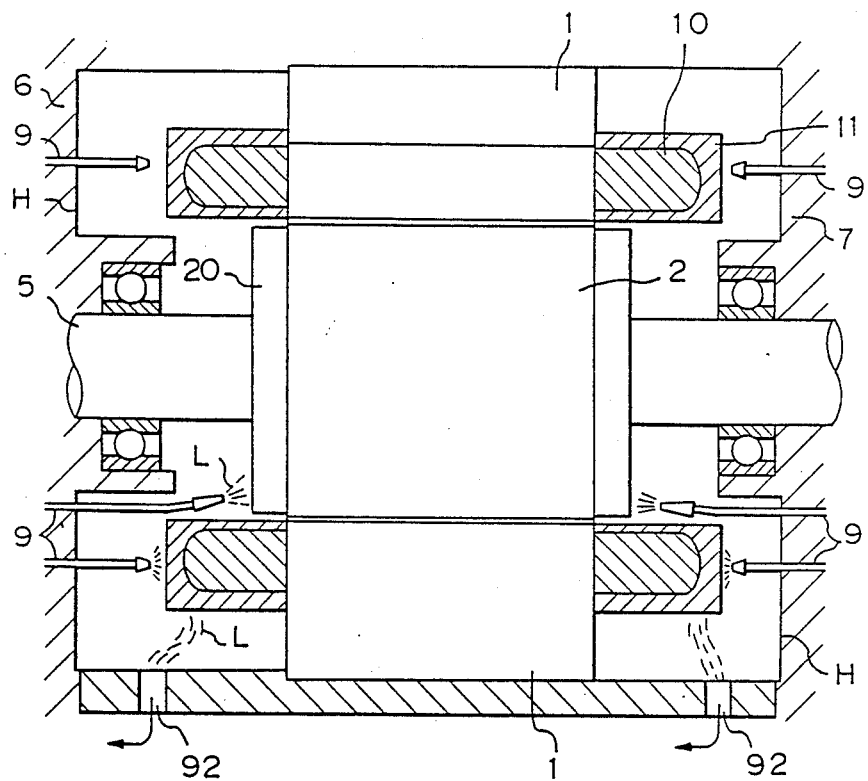
FIG. 2 is a schematic sectional view of a motor employing a motor cooling system in a second embodiment according to the present invention.
Figure 3:
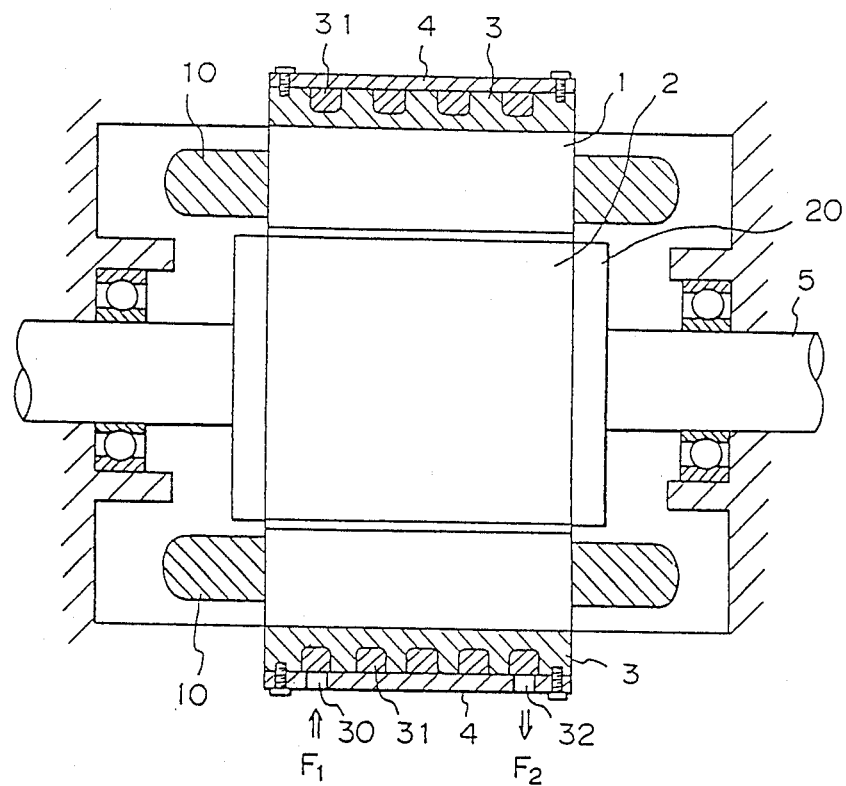
FIG. 3 is a schematic sectional view of a motor employing a conventional motor cooling system.

As shown in FIG. 2, the motor of Example 2 is similar in construction to the motor of Example 1 shown in FIG. 1, where the parts are presented by the same numerals except that nozzles 9 are inserted through a front housing 6 and a rear flange 7 in the interior of the motor so that the extremities of the nozzles 9 are positioned near the projecting portions 10 of the stator coils of a stator 1 and near the end rings 20 of a rotor 2 to make the cooling oil L flow from the nozzles 9 to outlet openings 92, instead of the cooling paths extending from the inlet opening 90 via the flow passage 91 to the outlet opening 92 in Example 1.

In operation, a cooling oil (or liquid) L was jetted by a pressurizing device, not shown, through the nozzles 9 against the projecting portions 10 of the stator coils and the end rings 20. The cooling oil L was drained through the outlet opening 92.

The projecting portions of the stator coils, and the end rings were directly cooled, and Example 2 had the same function and effect as Example 1.

Modifications

The oil employed as a cooling liquid may be replaced by cooling water, and the end rings of the rotor need not be coated with the synthetic resin layer to achieve the object of the object of the invention.

We claim:

1. A motor cooling system comprising:
   a coating layer coating projecting portions of stator coils of a stator of the motor;
   a cooling liquid cooling said projecting portions of said stator coils and cooling opposite ends of a rotor of said motor;
   an oil jacket surrounding said stator of the motor, said oil jacket having inlet and outlet openings formed on opposite sides of the oil jacket; and
   flow passages extending from the inlet opening, extending past the coating layer coating the projecting portions of the stator coils, extending past outer surfaces of end rings of the rotor and extending to the outlet openings of the oil jacket, wherein the cooling liquid flows through the flow passages.

2. A motor cooling system according to claim 1 wherein said oil jacket further comprises a helical groove provided on an outer circumference thereof.

3. A motor cooling system according to claim 2 further comprising an outer sleeve fitted on the outer circumference of the oil jacket, opposite ends of the helical groove connected respectively to an inlet opening and an outlet opening formed in the outer sleeve to define a second flow passage for the cooling liquid between the helical groove and an inner circumference of the outer sleeve.

4. A motor cooling system according to claim 1 further comprising a coating layer coating outer surfaces of said end rings of said motor.

* * * * *